US009282494B2

(12) United States Patent
Folke et al.

(10) Patent No.: US 9,282,494 B2
(45) Date of Patent: Mar. 8, 2016

(54) METHOD IN A RADIO NETWORK NODE FOR CONTROLLING HANDOVER DECISION OF A USER EQUIPMENT

(75) Inventors: Mats Folke, Lulea (SE); Konstantinos Dimou, Stockholm (SE); Harald Kallin, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 86 days.

(21) Appl. No.: 14/114,672

(22) PCT Filed: May 2, 2011

(86) PCT No.: PCT/SE2011/050545
§ 371 (c)(1),
(2), (4) Date: Oct. 29, 2013

(87) PCT Pub. No.: WO2012/150880
PCT Pub. Date: Nov. 8, 2012

(65) Prior Publication Data
US 2014/0066074 A1   Mar. 6, 2014

(51) Int. Cl.
*H04W 36/04* (2009.01)
*H04W 36/08* (2009.01)
H04W 36/20 (2009.01)
H04W 36/22 (2009.01)
H04W 36/30 (2009.01)
H04W 36/32 (2009.01)

(52) U.S. Cl.
CPC .............. *H04W 36/04* (2013.01); *H04W 36/08* (2013.01); *H04W 36/20* (2013.01); *H04W 36/22* (2013.01); *H04W 36/30* (2013.01); *H04W 36/32* (2013.01)

(58) Field of Classification Search
None
See application file for complete search history.

(56) References Cited

U.S. PATENT DOCUMENTS

| 6,285,884 B1* | 9/2001 | Vaara ............................. 455/441 |
| 2008/0096566 A1* | 4/2008 | Brunner et al. ................ 455/437 |
| 2008/0188215 A1* | 8/2008 | Bergstrom et al. ............ 455/424 |
| 2009/0046573 A1* | 2/2009 | Damnjanovic ................ 370/216 |

FOREIGN PATENT DOCUMENTS

| GB | 2474503 A | 4/2011 |
| WO | 2010/057125 A1 | 5/2010 |
| WO | WO 2010/050885 A1 | 5/2010 |
| WO | WO 2010/124913 A1 | 11/2010 |

OTHER PUBLICATIONS

3GPP TR 36.902 V9.3.1 (Mar. 2011); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

(Continued)

*Primary Examiner* — Ashish K Thomas

(57) ABSTRACT

A radio network node and method for improved control of handover decisions of a User Equipment (UE) in a wireless communications network. The UE is in a served cell and is moving towards a neighboring cell. The network node obtains neighboring cell characteristics and determines a mobility threshold based on the obtained neighboring cell characteristics. The handover decisions of the UE to the neighboring cell are then controlled based on the determined mobility threshold.

13 Claims, 4 Drawing Sheets

(56) References Cited

OTHER PUBLICATIONS

Alonso-Rubio, J. Self-optimization for handover oscillation control in LTE; Ericsson Res., Stockholm, Sweden; Network Operations and Management Symposium (NOMS), 2010 IEEE Apr. 19-23, 2010, pp. 950-953, DOI: 10.11 09/NOMS.201 0.5488335 URL: http:l/ieeexplore.ieee.org/stamp/stamp.jsp?tp=&arnumber-5488335.

Jansen, T. et al. Hand over Parameter Optimization in L TE Self-Organizing Networks; Tech. Univ. Braunschweig, Braunschweig, Germany; Vehicular Technology Conference Fall (VTC 2010-Fall), 2010 IEEE 72nd; Sep. 6-9, 2010, pp. 1-5. URL: http:l/ieeexplore.ieee.org/stamp/stamp.jsp?tp=&arnumber-5594245.

Aziz, et al. Autonomous Neighbor Relation Detection and Handover Optimization in L TE; Technical Journal 15(3), 63-84 (20 1 0)© 201 0 Alcatel-Lucent. Published by Wiley Periodicals, Inc. Published online in Wiley Online Library (wileyonlinelibrary.com)? DOI: 1 0.1002/bltj.20457 U RL: http://onlinelibrary. wiley .com/doi/1 0.1 002/bltj.20457/pdf.

Guangxi Zhu, et al.: "Load balancing based on velocity and position in multitier cellular system" Consumer Communications and Networking Conference, 2006. IEEE, Las Vegas, NV, USA, Jan. 1-8, 2006.

Ericsson: "Restructuring of HO settings adaptation chapter," 3GPP Draft; R3-093081, 3rd Generation Partnership Project (3GPP), Mobile Competence Centre; 650, route des Lucioles; F-06921 Sophia-Antipolis Cedex; France; Nov. 9, 2009.

* cited by examiner

METHOD IN A RADIO NETWORK NODE FOR CONTROLLING HANDOVER DECISION OF A USER EQUIPMENT

TECHNICAL FIELD

The present disclosure relates to a method for use in a radio network node and to the radio network node itself in a wireless communications network. In particular, it relates to control of handover decisions of a UE located in the wireless communications network.

BACKGROUND

The constantly increasing demand in high data rates requires cellular networks that can meet this expectation. A challenging question for operators is how to evolve their existing cellular networks so as to meet this requirement for higher data rates. In this respect, a number of directions have been indicated to operators: i) either to increase the density of their existing macro base stations, ii) or to increase cooperation of macro base stations, or iii) to deploy smaller base stations in areas where high data rates are needed within a macro base stations grid (options i) and ii) are discussed among other in academia).

The last option is termed in the related literature "Heterogeneous Network", or "Heterogeneous Deployment" and the layer consisted of smaller base stations is termed, "micro", or "pico", or "femto", or "home" layer. By smaller it is meant smaller in a definition of coverage, and in many times size as well.

Building a denser macro base stations grid and probably enhancing the cooperation with macro base stations, hence either using options i) or ii) above, is definitely a solution to meet the requirement for higher data rates; however, this is in several cases, a not so cost-efficient option. A reason being that costs and delays associated with the installation of macro base stations especially in urban areas are significant.

In existing landscape, a solution of deploying short range base stations, also sometimes denoted short range base stations, within the already existing macro layer grid is an appealing option. A reason being that these short range base stations are anticipated to be more cost-efficient than deployment of macro base stations, and their deployment time is shorter as well. In addition, such a dense deployment of macro base stations would lead to significantly high amount of signalling due to frequent handovers for users moving at high speeds.

The macro layer grid can serve mainly users moving at high speed, or wider areas where the demand for high data rates is not that high and the grid consisted of short range base station can cater for high density of users asking for high data rates, or "hotspots" as these areas are also termed. Macro layer communicates with micro-layer and dynamic sharing of resources is possible.

FIG. 1 shows a basic principle of heterogeneous wireless communications network 1 deployment. According to the figure, short range Base Stations (BSs) may be placed at border of one or more macro BSs. Each short range BS serves a cell which may be located in one macro BS cell or overlapping between two macro BSs. It is noted here that this scenario considers short range BSs such as short range network nodes, Low Power Nodes (LPNs), relays and micro/pico base stations, that are connected to macro base stations and that are controlled by the macro BS.

In the deployment above, it is of high importance that mobility management operates efficiently and as expected users moving at high speed do not camp onto this short range cells when in idle mode, and they do not handover (HO) to these short range cells when these users are in connected mode. In this case, users moving fast will generate too high signalling overhead due to the unnecessarily high amount of handovers generated. Moreover, these handovers generated by fast moving users are prone to Radio Link Failures (RLFs) during the exchange of HO signalling, due to the fast channel variations observed in the borders between macro and short range cells.

To the contrary, users moving at slow to medium range speeds, they need to handover to these short range cells, otherwise they are going to experience RLF, if they remain for long time connected to the previous macro base station or other short range BS, while they are in short range cell coverage.

In these heterogeneous networks it is of importance that User Equipments (UEs) moving fast and connected to macro BSs do not perform handovers to short range BSs, if the time during which these users are in the short range cells is very short. The same applies for fast moving UEs going from one short range cell to another short range cell. On the other hand, it is desired that the UEs moving slowly are attached to short range BSs to a highest possible extent.

In this context, it is readily understood that a means to achieve the desired goal mentioned above is that speed dependent mobility is used when users connected to macro base stations move towards short range BSs. Current 3GPP Technical Specifications, i.e. TS 36.331 & TS 36.304 support the feature "speed dependent mobility" for both connected and idle mode respectively. According to the specifications, 3 mobility states are supported: i) normal, ii) medium and iii) high mobility state (for both connected & idle mode). The number of cell reselections, or handovers is measured within a given time window and in case this number exceeds certain thresholds, the user mobility state, i.e. normal, medium or low, is set. For UEs in connected mode two states are supported, which are normal and high mobility state. Implementing speed dependent mobility state for UEs is considered to give good performance in most of the cases.

Assuming that speed dependent mobility is used, then the solution would be to set mobility triggers for high speed state in such a way, that users in connected mode, avoid doing handovers to short range cells, when the UEs are at high mobility state. Or, alternatively, another state is defined which is applied only when moving towards short range cells at high speeds.

Within any option, a major task within this mobility state dependent mechanism is how to set these parameters and what should trigger the mechanism. Within the specifications the mobility state setting, i.e. low (normal), medium, high speed state, is done on the basis of the number of handovers, or cell reselections, that are performed within a given time window. Deciding the number of handovers/cell reselections which is going to be the threshold/setting for different mobility states is already a challenging task within the speed dependent mobility triggers. In the case of short range cells, the definition of this setting becomes even more challenging. Hence, the question is how to set the number of handovers done within a given time window in an appropriate way for all short range cells. The reason is that short range cells may have different ranges which depend on different factors of various types. This is a new element within heterogeneous wireless communication networks, which did not exist within homogeneous networks.

E.g. consider a short range cell, A, with an estimated coverage diameter of approximately 30 m. It is to be noted here that in most of the cases cell diameter corresponds to twice the size of a cell range, hence cell diameter stands for the value which is two times the cell range. In case a UE has a speed of apprx. 110 km/h, a time needed for a UE to cross the whole coverage area of the short range cell is 1 sec, at most. In case an operator considers that this period of 1 second is good enough and no RLF is triggered within this period, then, an operator can set the threshold defining the high speed mobility state to a value corresponding to the speed of 110 km/h. As disclosed by the specification, the threshold defining the high speed state is the number of handovers within a given time window. E.g. for a UE moving with 110 km/h (i.e. 30 m/sec) then within a time window of e.g. 20 seconds, this specific UE in discussion here has crossed 600 m. In a typical big city environment, typically a UE is doing a handover approximately every 100-160 m, then a UE moving with the speed of 110 km/h, is performing in average 4-6 handovers within this time window of 20 seconds. An operator can set the threshold of number of handovers within this given time window of 20 seconds equal to 5, as an example. In case an operator sends this threshold equal to 5 for all of the short range cells, i.e. relays, low power network nodes located at any place in the macro grid, then this might be problematic. Consider a second short range cell, B, with a cell range of 60 meters. In this case, a UE crossing this cell B at a speed of 120 km/h is going to be considered as a high speed UE. As such, the mobility triggers, HO hysteresis and Time To Trigger (TTT) are going to be set in a way so as the UE moving from the macro cell towards the short range cell B does not perform handover to the pico cell, or in a way that the handover to this short range cell B is not so easily triggered. In this case, this specific UE remains within the coverage area of the short range cell, B, for 1.8 seconds, while still connected to the macro BS. Very likely the UE triggers RLF during this time window, due to this UE being so close to the short range BS in control of cell B.

This above mentioned scenario is illustrated in FIG. 2 with a given UE 6 being connected to a macro BS 2 serving a macro cell 3 and crossing different short range cells (pico cells) (5, 5') being served by a respective short range BS (4, 4') during its movement i.e. pico BS1 and pico BS2. It is to be noted here that the mobility state threshold, defining if the user is at normal, medium or high mobility state, is the number of handovers/cell reselections within a given time window. Within a given geographical area, this number can, without any loss of generality, be mapped to a given user speed as exemplified by the figure.

Also short range cells can have significantly different ranges and their range can be modified or adapted e.g. in-band relays and pico cells may have different ranges which are extended or shrunk for load balancing purposes.

Therefore, setting a unique mobility state threshold is an option which is going to create several problems within a deployment featuring short range cells.

SUMMARY

It is therefore an object to provide a method for use in a radio network node, and a radio network node, for improved control of handover decisions of UEs being in a served cell of a heterogeneous wireless communications network.

In an example of embodiments, the object is achieved by a method for use in a radio network node for controlling handover decision of a UE in a wireless communications network comprising one or more radio network nodes. The UE is in a served cell and moving towards a neighbouring cell. The method comprises: obtaining neighbouring cell characteristics; determining a mobility threshold based on the obtained neighbouring cell characteristics; and, controlling handover decision of the UE to the neighbouring cell based on the determined mobility threshold.

In an example of embodiments, there is provided a radio network node for controlling handover decision of a UE in a wireless communications network comprising one or more radio network nodes. The UE is in a served cell and moving towards a neighbouring cell. The radio network node comprises a transceiver circuit, a processor circuit and a control circuit. The transceiver circuit is configured to obtain neighbour cell characteristics. The processor circuit is configured to determine a mobility threshold based on the obtained neighbouring cell characteristics. The control circuit is configured to control handover decision of the UE to the neighbouring cell based on the determined mobility threshold.

An advantage achieved by at least one of the above mentioned embodiments is that a number of Radio Link Failures (RLFs) in the heterogeneous wireless communications network is reduced.

Another advantage is efficient radio resource usage and improved control of handover decisions in the heterogeneous wireless communications network.

Other objectives, advantages and novel features of aspects of the present disclosure will become apparent from the following detailed description of embodiments and aspects.

BRIEF DESCRIPTION OF THE DRAWINGS

The embodiments are described in more detail with reference to attached drawings illustrating exemplary embodiments and in which.

DETAILED DESCRIPTION

Figure 1:
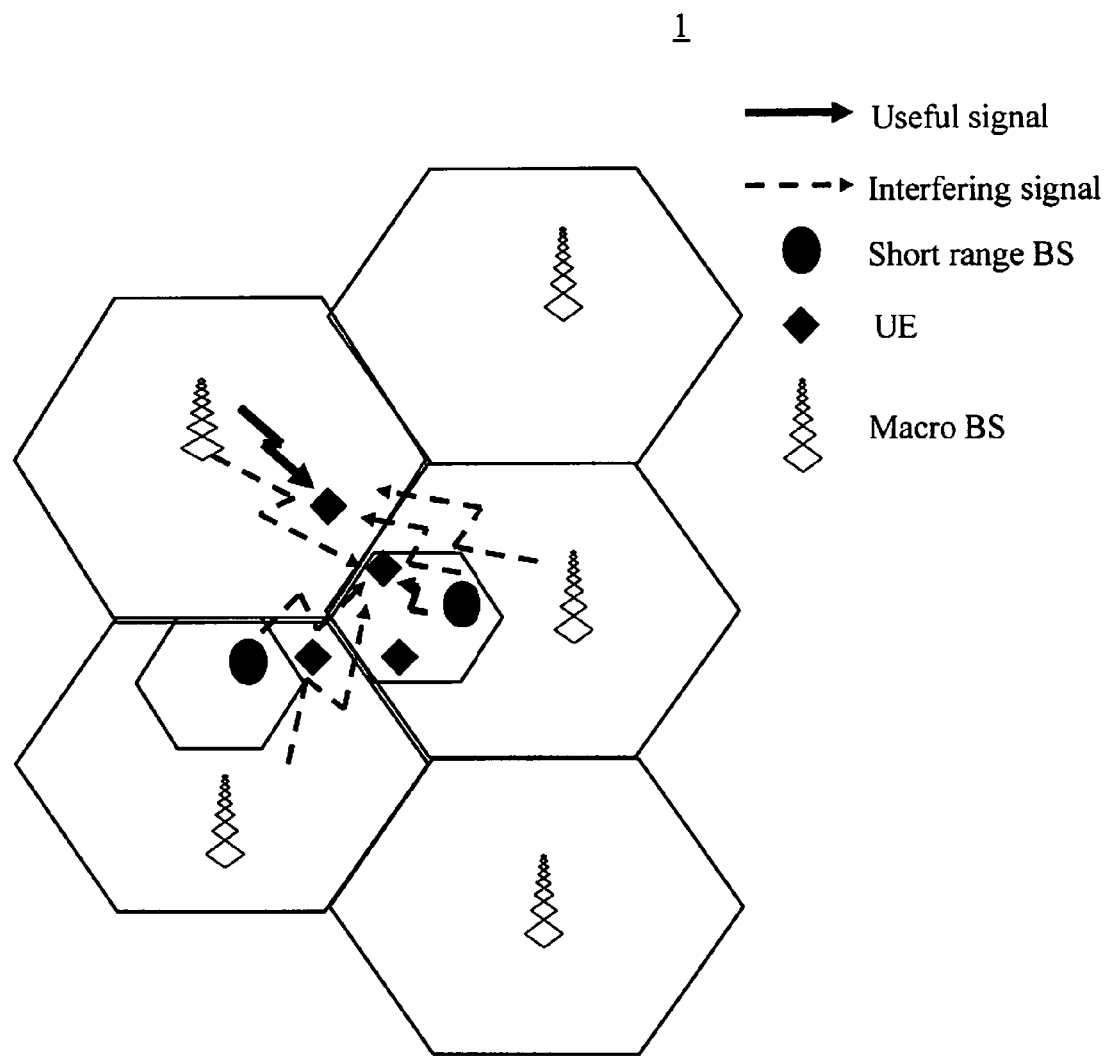
FIG. 1 Illustrates a basic scenario of wireless communications network deployment.

In a system featuring speed, and direction, dependent mobility triggers, and in a wireless network consisted of radio network nodes of different types, i.e. of radio base stations (RBSs), macro, micro, pico, femto base stations and relay nodes, it is suggested to define a mobility state of UEs per short range cell and/or per UE traffic type. Short range cells are also denoted small range cells or small area cells. A reason is that in heterogeneous deployments, the range of short range cells varies significantly and these variations may be dependent on: i) a type of short range base station, i.e. relay node, open access (OA) pico, or Closed Subscriber Group (CSG) femto etc; ii) a distance from short range base station (BS) to closest macro BS (eNB(s)); iiv) a cell selection offset for the short range BS; iv) and, cell topology, e.g. short range BS being located at street canyon, if yes, street orientation to the macro BS, etc.

i), ii) and iv) mentioned above are typically static and therefore they account for the cell range variations among different short range BSs, also denoted Low Power Nodes (LPN). iii) may be changed dynamically and it accounts for cell range variation among cells as well as cell range variations in time within a certain short range BS.

A cell range of a for example pico cells, which is an example of a short range BS, may be known to the macro BS controlling UEs in the macro cell. Pico BSs may ask UEs which are in their coverage area to report their RSRP and their position when performing handovers to neighbouring cells. This information may then be forwarded to neighbour macro BSs. An alternative method to be aware of the cell range of a short range cell is to have/obtain an input from an operator, which has made coverage measurements in this short range cell. This method is however expensive for an operator and it is error-prone.

Another way to derive the cell range of a short range cell is to make use of parameter values used inside the short range cell, i.e. DL output power, etc. This method is providing an approximate estimation of the cell range though.

Another alternative is to derive the cell range of a short range cell by combining information on an average time spent in the short range cell and on the UE speed, i.e. moving speed/velocity of a UE travelling at a certain determined speed in a certain determined direction. Time spent in the short range cell is measured by the macro base station (eNBs), or by the base station serving the short range cell, and may be exchanged via neighbour macro BSs. Information exchanged via an Information Element (IE) that is exchanged between neighbour BSs during Handover (HO) and when a serving macro BS has issued a Handover Request message with the IE UE history transmitted. UE moving speed or velocity may be estimated by several known techniques. IE is a parameter contained within a signalling message (e.g. Radio Resource Control (RRC)).

Mobility states are also reported by the UEs to their serving BS, macro BSs or short range i.e. pico, LPN etc. Hence serving macro BSs are well aware of the UE speed state and the cell range of the short range cell to which the UE is approaching. Typically the mobility state is set based on a threshold which is the number of handovers or cell reselections performed for example by a UE within a given time window.

Figure 3:
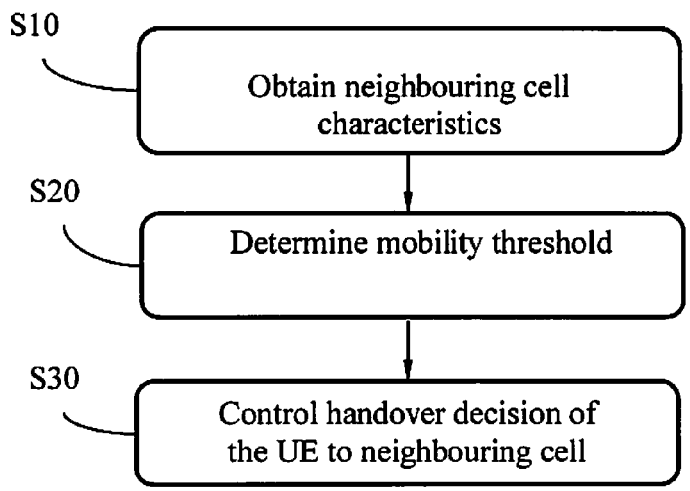
FIG. 3 is a flowchart depicting an example of an embodiment of a method for use in a radio network node.

FIG. 3 is a flowchart depicting an example of an embodiment of a method for use in a radio network node in which method the mobility threshold is determined in a way improving the handover decisions. According to the figure, the method is for use in a radio network node for controlling handover (HO) decision(s) of a UE(s) in a wireless communications network comprising one or more radio network nodes. The radio network node here may be considered to be a macro BS, a radio network controller, an eNodeB, a base station controller, an MME, a source BS or a short range node. The neighbouring cell may be a cell served by a macro BS or by a short range BS. The neighbouring cell may also be a cell served by a neighbouring radio network node. The UE is being located in a served cell and is moving towards a neighbouring cell, at a certain speed in a certain direction. According to an embodiment the radio network node is a base station, preferably the macro BS, and the neighbouring cell is served by the macro BS, or by a neighbouring BS such as a short range BS or a neighbouring macro BS. According to yet one embodiment, the radio network node is in a wireless communications network which may comprise, radio network nodes of different characteristics and capabilities, such as pico base stations, femto base stations, relay nodes etc. The wireless communications network may be a heterogeneous wireless communications network.

The method mentioned above comprises a step of obtaining S10 neighbouring cell characteristics. This may be done by retrieving/receiving the neighbouring cell characteristics (neighbouring cell information) from another radio network node i.e. the neighbouring BS or from an Operation and Maintenance (O&M) node, or by internally extracting the neighbouring cell information from a memory where it is stored in the radio network node. It is also possible to obtain S10, i.e. get/receive/retrieve etc, the neighbouring cell characteristics from a central node or from an operator/administrator. According to an embodiment the cell characteristics are periodically reported by radio network nodes i.e. macro BSs or short range BSs, to the radio network node or to neighbouring macro BSs or short range BSs. The reporting may also be done upon request.

The method also comprises a step of determining S20 a mobility threshold based on the obtained neighbouring cell characteristics. The determining S20 of a mobility threshold may comprise determining one or more of the following: a neighbouring cell range; Radio Link Failure, RLF, timers; and, maximum allowed duration for the UE to remain in the neighbouring cell without performing handover of the UE to that cell and/or without the UE causing significant interference to other UEs in the neighbouring cell. According to an embodiment, the cell range of a neighbouring cell range may be considered as, R, wherein a cell diameter is 2R. Note that the cell does not always necessarily need to be circular but this example is given in a clarifying purpose. The RLF timers may be session dependent and or traffic type dependent.

Following above, other parameters may also be used as a bases for determining S20 the mobility threshold mentioned above, such as: a type of a serving base station and a neighbouring base station; a distance between a neighbouring base station and a serving base station; an angle of a neighbouring base station towards a central beam from a serving base station and/or any other closely located base station; downlink transmit power of a neighbouring base station to the UE; neighbouring cell offset; uplink power control target; and a geographical location of a neighbouring base station. i.e. street orientation to the BS (the macro BS).

According to an example of embodiment, the mobility threshold may be adaptively set to reflect typical cases that are desired to be avoided. E.g. measurements of the UE velocity and time spent in a cell may be used to determine the mobility threshold, so that UEs moving faster than the mobility threshold do not handover into the neighbouring cell. On the other hand, UEs moving slower are allowed to hand over into the neighbouring cell. By basing the mobility threshold on actual measurements, this mechanism becomes adaptive to local conditions, e.g. catching UE passages that traverses the neighbouring cell at the cell edge (circle secants rather than circle diameters), or in case of patchy coverage where one cell is providing the highest signal in a distant, but tiny, spot.

Referring back to FIG. 3, in an embodiment, the method further comprises controlling S30 handover decision of the UE to the neighbouring cell based on the determined mobility threshold, determined in step S20. The controlling S30 may comprise sending the mobility threshold to another radio network node or to the neighbouring radio network node wherein the neighbouring radio network node is a macro BS or a short range BS. The sent mobility threshold is used in enabling the other radio network node, or neighbouring BS, to control handover decisions.

Figure 4:
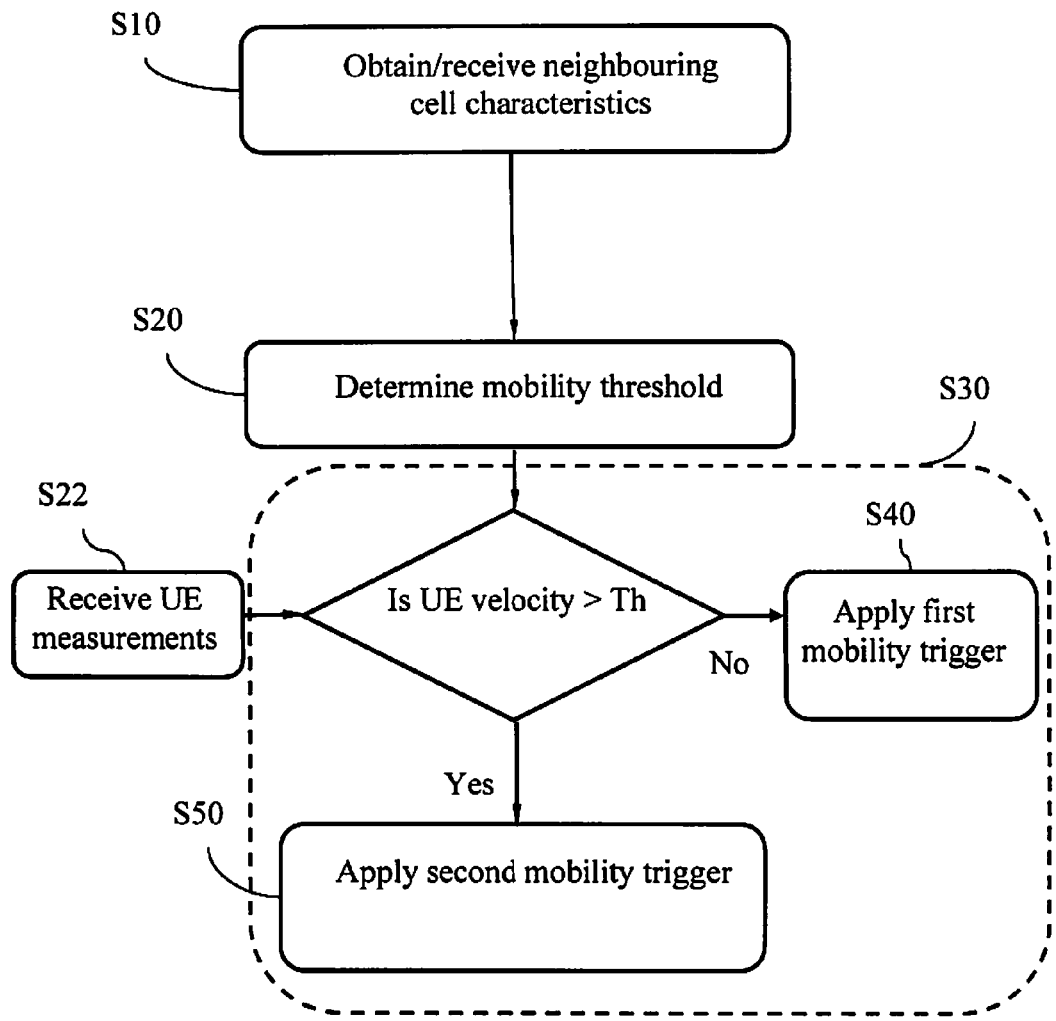
FIG. 4 is a flowchart depicting yet further examples of embodiments of the method for use in a radio network node.

FIG. 4 is a flowchart depicting yet further examples of embodiments of the method for use in a base station. According to FIG. 4 the controlling (S30) further depends on measurement reports received S22 from the UE, the measurement reports comprises moving speed and/or direction, i.e. velocity, information of the UE and/or determined mobility state of the UE. The controlling S30 may further comprise determining if the UE has a moving speed which results in that the mobility threshold is exceeded, or not. This is typically done by use of a comparisons procedure. Based on a result from the comparison the controlling further comprises applying S40 a first mobility trigger allowing handover of the UE to the neighbouring cell, when the mobility threshold is determined to not have been exceeded. Further on, the controlling comprises applying S50 a second mobility trigger making handover of the UE to neighbouring cell(s) very difficult, when the mobility threshold is determined to have been exceeded. Note again that the neighbouring cell may be served by the radio network controller, when being a macro BS, or by a neighbouring radio network node such as a neighbouring macro BS, neighbouring short range BS or any similar node.

Following are some non-limiting illustrating examples of how the embodiments mentioned earlier may be exemplified. By knowing an average distance between handovers/cell reselections within a given cell area, it is possible to map a mobility threshold in number of handovers/cell reselections to an average distance run and consequently to an average UE speed and perhaps to UE direction as well. According to the method and embodiments mentioned earlier the mobility threshold may be defined on a basis of: i) the timers triggering RLF, ii) the cell range of the short range BS and iii) the maximum duration allowed in the short range BS, T_duration_max, without creating significant interference to other UEs in the short range BS.

Considering that the timers triggering handover are more than one e.g. T310, T304, as it derivers from 3GPP technical specification, TS 36.331, it is assumed that the shortest timer among those, t_rlf, is selected as the basis for setting the mobility threshold. Timer T310 triggers RLF due to out-of-sync indications at the PDCCH, hence bad link quality when UE connected and exchanging data and control with the serving radio network node (eNB, BS etc). T304 triggers RLF when the maximum number of Random Access Attempts (RAA) has been reached i.e. when the UE is performing handover or when the UE tries to synchronize in uplink. These timers may be set to different values, e.g. T310 equal to 2 sec and T304 to a maximum number of 6 RACH attempts, which might result into a time different than 2 sec, probably less. In this case it is a shortest time period that defines the mobility threshold. It is consider that a UE may avoid performing handover to a short range cell, if a sojourn time within this short range cell, t_s, is less than the time needed so as to declare radio link failure, t_rlf. Hence:

$$t\_s \leq t\_rlf \quad (1)$$

It is assumed that the longest sojourn time of a given UE with a given average speed, in a short range cell is observed when the UE crosses the entire short range cell on a direction of a cell diameter. If a cell radius is R, the UE speed, v, should be such that the UE is crossing a whole short range cell before RLF is triggered, i.e:

$$t_s \leq t_{RLF} = \frac{2 \cdot R}{v\_threshold} \Rightarrow v\_threshold = \frac{2 \cdot R}{t_{RLF}} \quad (2)$$

In addition, a maximum allowed duration, T_duration_max, for the UE in the short range cell (pico cell or other) so as the UE is not creating significant other cell interference to other UEs in the short range cell, is also considered for setting of the mobility threshold. Hence, the time threshold, t_threshold, used for the estimation of the mobility threshold, v_threshold, is the minimum of t_s and T_duration_max:

$$t\_threshold = \min(t\_s, t\_duration\_max) \quad (3)$$

Hence, the mobility threshold per short range cell is estimated on the basis of t_threshold and on the basis of the estimated cell range, R, of the short range cell:

$$v\_threshold = \frac{2 \cdot R}{t\_threshold} \quad (4)$$

In case the estimated and reported, or internally in the macro BS detected, UE's moving speed in a certain direction, i.e. velocity, is below this mobility threshold, then the UE applies a set of mobility triggers. A first mobility trigger(s) is/are applied, Set_1, which corresponds to a normal mobility state and allows handovers to small range cells. In case the estimated/detected UE's moving speed is above this mobility threshold, then the UE applies a second set of mobility triggers, Set_2, which corresponds to a high mobility state and which does not allow easily handover to short range BSs, or makes handover to these short range cells and to other neighbouring cells very difficult. These triggers (Set_1, Set_2) are used to control handover decisions in the wireless communications network 1 (heterogeneous network).

For any UE moving speed higher than a determined mobility threshold, the time period during which the UE remains in the coverage area of this cell (target cell that is), hence the sojourn time in this specific cell is shorter than the time needed so as to trigger RLF.

The cell diameter of a short range cell, 2R, and equivalently the range of a short range cell, R, may be tunable for load balancing purposes. Upon any change of the cell range, the speed dependent mobility threshold is updated. Serving macro BSs as well as smaller BSs (i.e. short range BSs) make their handover decisions to these smaller cells on the basis of new trigger(s). UEs may continue reporting, i.e. sending in measurement reports, by using previous reporting criteria. It is on a serving BS to decide if the UE that has reported an event is going to perform handover or not.

As a following example, each cell may have one measurement report setup, e.g. 3 dBs, 320 ms. Upon reception of a measurement report from a given terminal, then the serving BS may decide if handover has to be done. This decision is based on
  i) reported Reference Signal Received Power (RSRP) values
  ii) Time To Trigger (TTT)
  iii) Identity of the target cell, i.e. the neighbouring cell
  iv) UE speed
In case the target cell is a pico cell (i.e. short range cell), then specific HO triggers are applied. An example may be seen in table 1. It is assumed that each cell has two handover triggering set ups (Set_1, Set_2), at least:
  Set_1. the "default HO triggers set", eg 3 dB and 320 ms, and
  Set_2. a "pico cell triggers set", eg 6 dB and 640 ms
and they are applied as shown in the table below for different UE moving speeds. The table below shows the handover triggering set to be applied per neighbour cell type. According to this illustration, it is assumed that the source cell is a macro cell. Assume a given UE moving at low speed and reports measurements indicating that "easy", or "default HO triggers set" is reported. Then the source macro BS (eNB) checks what the type of the candidate target cell is. If the candidate target cell is non-pico, i.e. macro cell, as well, then the "default HO triggers set" 1 is used. Unless, if the access to the neighbour macro cell is not allowed, hence the set 2 is used (in brackets in the respective text box). If the neighbour cell is pico, then again the default HO triggers set 1 is applied (unless if the source cell does not want UEs to perform HOs to this specific target pico cell and where the HO triggers set 2 is used).

Assume that the same UE moves with high speed at the same area. Then the same check is done. If the neighbour cell is macro as well, then default HO triggers set 1 is applied and the UE performs handover. If the neighbour cell is a pico-cell, then the HO decision is done on the basis of the pico cell HO triggers set 2 and hence the UE is not handed over to the pico cell.

TABLE 1

Handover decisions at the serving macro BS for different cell types and UE speeds.

| HO triggered by UE measurement report(s) | UE moving speed | | |
|---|---|---|---|
| | Low | Medium | High |
| Non Pico | 1 (or 2) | 1 (or 2) | 1 (or 2) |
| Pico | 1 (or 2) | 2 | 2 |

According to an embodiment, in case an operator wants to minimize the amount of measurement reports transmitted, the operator might transmit the different HO triggering sets and the UE reports only the one which is applicable to its speed and to the detected neighbour candidate target cell. In this case updated mobility thresholds are transmitted to UEs. However, since these mobility thresholds are cell specific and since UEs should not know what is the type of a cell that the UEs are approaching to, the most appropriate implementation would be that BSs transmit the minimum/easiest trigger to be met e.g. 3 dB, 320 ms in the example above, to UEs.

Cell range adaptation may be achieved by changing Downlink Transmission power, DL Tx power, of the short range BS, or a uplink power control target P0 for UEs connected to the short range BS, or by modifying a cell selection offset. This adaptation may be commanded by a macro BS to the short range BS and hence the adaptation of the mobility threshold is done internally at the macro BS to compensate or to adjust to the adaptation. Alternatively, there might be cases where either the cell range or the "RLF timers" are updated by the short range BS. In these cases, the updated cell range and mobility threshold may be estimated either internally at the short range BS or at the macro BS. In case the new cell range is estimated within the short range BS, then, the updated mobility threshold may also be estimated at the short range BS and signalled via for example the X2 interface or S1 interface to the neighbour macro BSs.

It is readily understood that the embodiments disclosed herein implies that upon change of the cell offset, the DL Tx Power, or the uplink power control target P0, the cell range, 2R, is estimated (i.e. re-estimated). This implies that the short range cells constantly perform measurements and may have mapping tables based on measurements that map the herein mentioned parameters (DL Tx Power etc) to cell ranges. In addition, it is assumed that the average distance for handover/cell reselections within a given cell area is available. These measurements may be seen as measurements done in a Self Organizing Networks (SON) context.

Considering that two different short range cells have a same set of values for the parameters mentioned above, then, the cell range might be different between these short range cells. Further parameters may have affected such as: i) distance of the short range BS to the closest macro BS and ii) the angle of the short range BS to the main beam of a closest macro BS. Therefore there is a need to have a mobility threshold, v_threshold, per short range BS, even if the cell selection offset, the DL Tx Power and UL power control target P0 are the same for a number of short range BSs.

Figure 2:
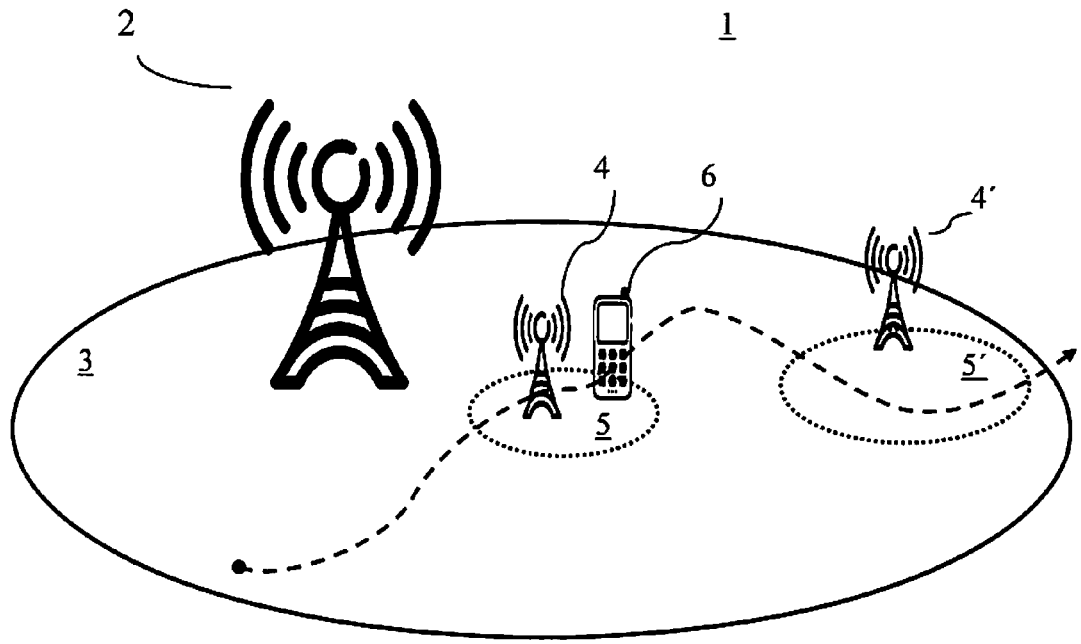
FIG. 2 Illustrates a scenario in which a UE is connected to macro cell crosses different short range cells during its movements.

It is also readily understood, that macro BSs should be aware that a given report from a given UE for a designated neighbour cell refers to a pico cell within the macro cell's coverage area. Macro BSs may have information on which reference symbol sequences belong to short range cells in their coverage area. As an example macro base station 2 in FIG. 2 is aware of the Reference Signal Sequences transmitted (& identifying) by pico base stations 4 & 4' (cells 5 & 5').

Figure 5:
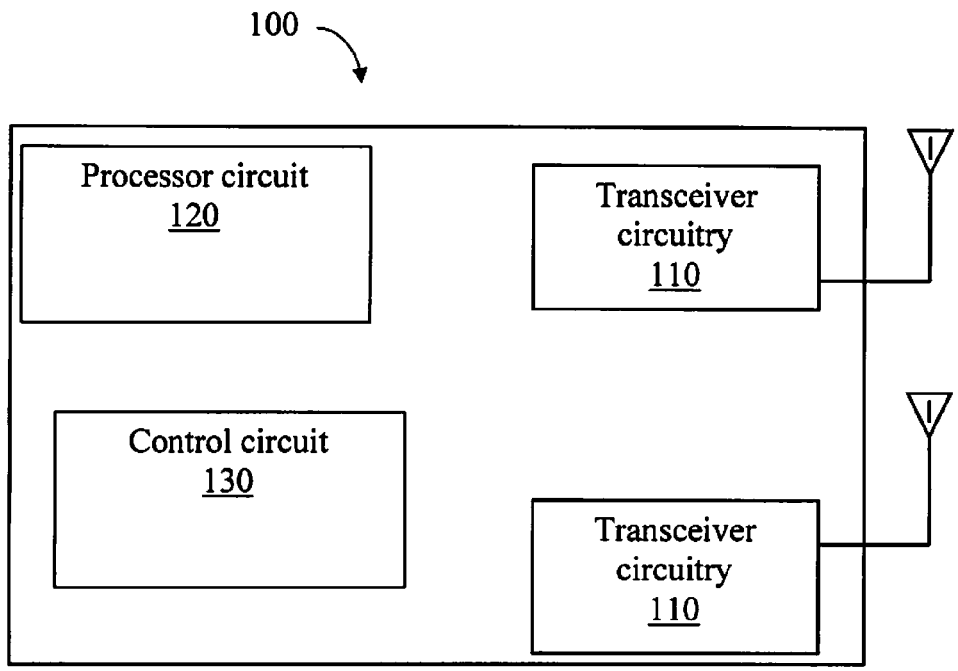
FIG. 5 is a schematic block diagram illustrating an example of embodiments of the radio network node.

FIG. 5 is a schematic block diagram illustrating an example of embodiment of the radio network node. The radio network node 100, which may be a macro BS (2, 100) or a short range BS (4, 4'), is for controlling handover decision of a UE 6 in a wireless communications network 1 comprising the base station 100, the UE 6 and a neighbouring base station (4, 4').

Note that although it may in this illustration seems that the radio network node is restricted to be a macro BS and that the neighbouring BS is the short range BS, this it not always the case. The BS may as well be a short range BS. According to another embodiment the BS and the neighbouring BS are both macro BSs or the same macro BS controlled by a radio network node which is a Radio Network Controller (RNC), a Mobility Management Entity (MME), O&M or similar. The UE 6 may be in a served cell (3) and is moving towards a neighbouring cell (5, 5'), that, as an example may be served by a neighbouring BS (4, 4'). The UE may be moving at a certain speed i.e. UE moving speed.

Referring back to FIG. 5, the radio network node (2, 100) comprises a transceiver circuit 110, a processor circuit 120 and a control circuit 130.

Figure 6:
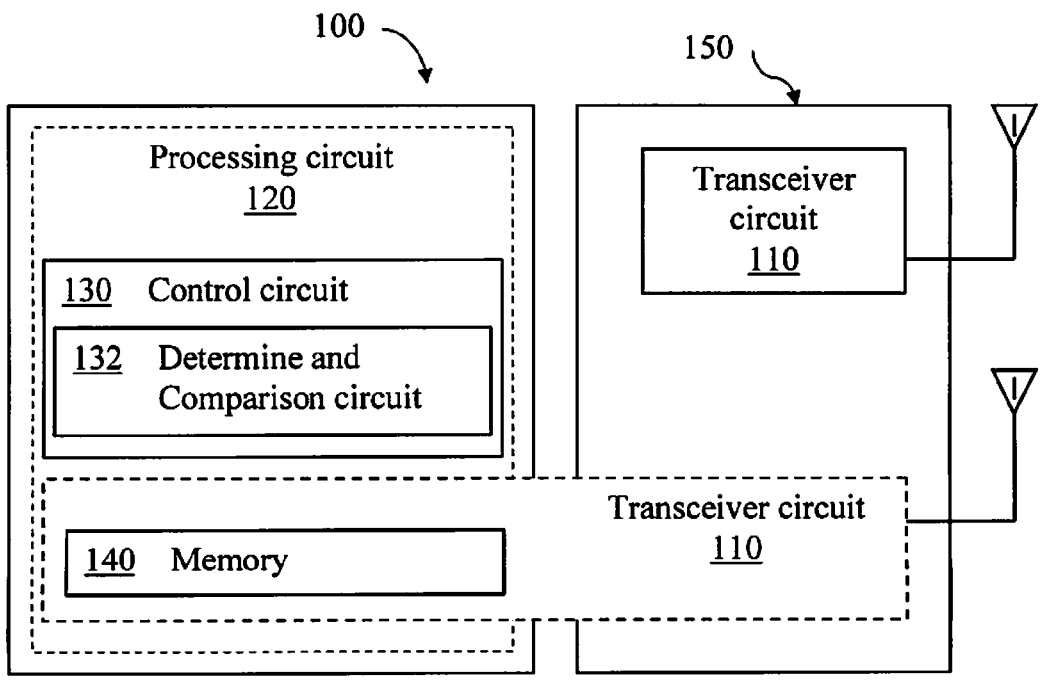
FIG. 6 is a schematic block diagram illustrating further example of embodiments of the radio network node.

The transceiver circuit 110 is configured to obtain neighbour cell characteristics, either by sending a request to, or by periodically receiving cell characteristics from, other radio network nodes or neighbouring BS(s). The transceiver circuit 110 may also send the periodically received cell characteristics to a storage memory 140 from where they may be extracted later on when needed. The memory 140 may be an internal part of the transceiver circuit 110 or a part of the processor circuit 120, showed with dashed lines in FIG. 6. FIG. 6 also illustrates that the radio network node 100 may be a central node or any other node separated from a BS 150 and which may have some functionality distributed them between.

The processor circuit 120 is configured to determine a mobility threshold based on the obtained neighbouring cell characteristics. The processor circuit 120 may further be configured to determine a mobility threshold comprising one or more of the following: a neighbouring cell range; Radio Link Failure, RLF, timers; and, maximum allowed duration for the UE to remain in the neighbouring cell without performing handover of the UE to that cell and/or without the UE causing significant interference to other UEs in the neighbouring cell. According to an embodiment, the processor circuit 120 is configured to determine a mobility threshold comprising RLF timers that are session dependent and or traffic type dependent.

According to an embodiment, the processor circuit 120 is configured to determine a mobility threshold comprising a neighbouring cell range that is based on one or more of the following: a type of a serving base station, i.e. serving the UE, and a neighbouring base station i.e. a neighbouring BS to the serving BS when such a neighbouring BS exists; a distance between a neighbouring BS and a serving BS; an angle of a neighbouring BS towards a central beam from a serving BS and/or any other closely located BS; downlink transmit power of a neighbouring BS to the UE; neighbouring cell offset; uplink power control target; and a geographical location of a neighbouring BS. Note that the neighbouring BS may be the BS serving the neighbouring cell to which the UE is heading at.

In case the radio network node is a macro BS and the neighbouring cell is served by a neighbouring BS, e.g. a short range BS, the mobility threshold may therefore comprise a neighbouring cell range that is based on one or more of the following: a type of the neighbouring BS i.e. adjustable or non-adjustable cell offset; a distance between the neighbouring BS and the macro BS; an angle of the neighbouring BS towards a central beam from the BS and/or any other closely located macro/pico BSs; downlink transmit power of neighbouring BS; neighbouring cell offset; uplink power control target; and a geographical location of the neighbouring BS.

Referring back to FIG. 5, the control circuit 130 is configured to control handover decision of the UE to the neighbouring cell based on the determined mobility threshold. According to an embodiment, the control circuit 130 is configured to receive measurement reports from the UE, via the transceiver circuit, the measurement reports comprising moving speed and/or direction information of the UE, and/or determined mobility state of the UE, and control handover decisions based on the received measurement reports. Alternatively, the UE measurement reports are received from another radio network node in which they are stored.

Following above, according to an embodiment, the control circuit 130 comprises a determine and comparison circuit 132 configured to determine if the UE has a moving speed which results in that the mobility threshold is exceeded, or not. This is further illustrated by FIG. 6. Based on a result from the determining/comparison, the determine and comparison circuit 132 is configured to apply a first or a second mobility trigger as mentioned earlier in this disclosure. The first mobility trigger is applied and allowing handover of the UE 6 to the neighbouring cell (5, 5'), when the mobility threshold is determined to not have been exceeded. The second mobility trigger is applied and makes handover of the UE 6 to neighbouring cell(s) (5, 5') very difficult, when the mobility threshold is determined to have been exceeded.

The term short range BS may relate to any type of BS which communicates with UEs within its area and which communicates over a wireless link to another BS i.e. macro or pico.

Note that the control of handover decisions may be performed between macro BS and macro BS, macro BS and short/small range BS/BSs, or between short/small range BS and short/small range BS. The control of handover decisions may be performed by a central network node or a radio network node in the Radio Access Network (RAN). The control of handover decisions may be performed internally by a radio network node or BS itself or by sending the control information i.e. mobility threshold to another radio network node or BS (macro BS or short range BS). The exchange of cell characteristics for a purpose of control of handover decisions may be an initiated procedure initiated by a source BS, macro BS or short range BS, or periodically reported by a target BS, macro BS or short range BS. The procedure may be initiated by the radio network node or by any other node in the wireless communications network, which may be a heterogeneous wireless communications network.

Further, it is to be noted that some of the described circuits/circuitries 110-130 comprised within the BS 100 are to be regarded as separate logical entities but not with necessity separate physical entities.

The method in FIG. 3 and FIG. 4 for use in a radio network node (2, 4, 4', 100) (or in a macro BS 2 or pico BS (4, 4')) may further be implemented through one or more processor circuits/circuitries 110-130, in a radio network node, a macro BS, a pico BS, a home BS, or any other type of short range BS, together with computer program code for performing the functions of the present method(s). Thus a computer program product, comprising instructions for performing the method in a RN may assist, when the computer program product is loaded into or run in the radio network node 100.

The computer program product mentioned above may be provided for instance in the form of a data carrier carrying computer program code for performing the method in a radio network node (2, 4, 4', 100) when being loaded or run on the radio network node (2, 4, 4', 100). The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server or in a radio network node and downloadable to the radio network node (2, 4, 4', 100) remotely, e.g. over an Internet or an intranet connection.

When using the formulation "comprise" or "comprising" it is to be interpreted as non-limiting, i.e. meaning "consist at least of". The present invention is not limited to the above described preferred embodiments. The term configured to may be equally exchangeable with being adapted to and is considered to have the same meaning. Various alternatives, modifications and equivalents may be used. Therefore, the above embodiments are not to be taken as limiting the scope of the present invention, which is defined by the appending claims.

The invention claimed is:

1. A method for use in a radio network node for controlling a handover decision of a User Equipment (UE) in a heterogeneous wireless communications network comprising one or more radio network nodes having different characteristics and capabilities, the UE being in a served cell and moving towards a neighboring cell, the method comprising:
    obtaining neighboring cell characteristics, said characteristics including a cell range of the neighboring cell;
    determining a mobility threshold for the UE based on the obtained neighboring cell characteristics;
    determining a velocity of the UE, comprising a UE speed and direction of movement; and
    controlling the handover decision of the UE to the neighboring cell based on the determined mobility threshold and the velocity of the UE, wherein for a given cell range of the neighboring cell, the controlling step includes:
        determining whether the UE velocity is greater than a velocity threshold;
        when the UE velocity is not greater than the velocity threshold, applying a first mobility trigger that allows unrestricted handovers to cells having the given cell range; and
        when the UE velocity is greater than the velocity threshold, applying a second mobility trigger that restricts handovers to cells having the given cell range.

2. The method according to claim 1, wherein determining the mobility threshold comprises determining one or more of the following:

Radio Link Failure (RLF) timers; and maximum allowed duration for the UE to remain in the neighboring cell without performing handover of the UE to the neighboring cell or without the UE causing significant interference to other UEs in the neighboring cell.

3. The method according to claim 1, wherein determining the mobility threshold comprises determining RLF timers that are session dependent or traffic type dependent.

4. The method according to claim 1, wherein determining the mobility threshold comprises determining the neighboring cell range based on one or more of the following:

a type of a serving base station and a neighboring base station;

a distance between the neighboring base station and the serving base station;

an angle of the neighboring base station towards a central beam from the serving base station or any other closely located base station;

downlink transmit power of the neighboring base station to the UE;

neighboring cell offset;

uplink power control target; and a geographical location of the neighboring base station.

5. The method according to claim 1, wherein controlling comprises sending the mobility threshold to a neighboring radio network node to enable the neighboring radio network node to control handover decisions.

6. The method according to claim 1, wherein the radio network node is a macro base station, a short range base station connected to a macro base station, or a central network node.

7. The method according to claim 1, wherein the served cell and the neighboring cell are served by the radio network node or by different radio network nodes.

8. A radio network node for controlling a handover decision of a User Equipment (UE) in a heterogeneous wireless communications network comprising one or more radio network nodes having different characteristics and capabilities, the UE being in a served cell and moving towards a neighboring cell, the radio network node comprising:

a transceiver circuit configured to obtain neighboring cell characteristics, said characteristics including a cell range of the neighboring cell;

a processor circuit configured to determine a mobility threshold for the UE based on the obtained neighboring cell characteristics, and a velocity of the UE, comprising a UE speed and direction of movement; and a control circuit configured to control the handover decision of the UE to the neighboring cell based on the determined mobility threshold and the velocity of the UE, wherein for a given cell range of the neighboring cell, the control circuit is configured to:

determine whether the UE velocity is greater than a velocity threshold;

when the UE velocity is not greater than the velocity threshold, apply a first mobility trigger that allows unrestricted handovers to cells having the given cell range; and when the UE velocity is greater than the velocity threshold, apply a second mobility trigger that restricts handovers to cells having the given cell range.

9. The radio network node according to claim 8, wherein the processor circuit is configured to determine a mobility threshold comprising one or more of the following:

Radio Link Failure (RLF) timers; and maximum allowed duration for the UE to remain in the neighboring cell without performing handover of the UE to the neighboring cell or without the UE causing significant interference to other UEs in the neighboring cell.

10. The radio network node according to claim 8, wherein the processor circuit is configured to determine a mobility threshold comprising RLF timers that are session dependent or traffic type dependent.

11. The radio network node according to claim 8, wherein the processor circuit is configured to determine a mobility threshold comprising a neighboring cell range based on one or more of the following:

a type of a serving base station and a neighboring base station;

a distance between the neighboring base station and the serving base station;

an angle of the neighboring base station towards a central beam from the serving base station or any other closely located base station;

downlink transmit power of the neighboring base station to the UE;

neighboring cell offset;

uplink power control target; and a geographical location of the neighboring base station.

12. The radio network node according to claim 8, wherein the control circuit is configured to send the mobility threshold, via the transceiver circuit, to a neighboring radio network node to enable the neighboring radio network node to control the handover decision.

13. The radio network node according to claim 12, wherein the radio network node is a macro base station and the neighboring radio network node is another macro base station or a short range base station connected to the macro base station.

* * * * *